United States Patent [19]

Strojny et al.

[11] Patent Number: 5,852,333
[45] Date of Patent: Dec. 22, 1998

[54] ELECTRIC ACTUATOR RETURN-TO-NORMAL USING CAPACITOR ENERGY STORAGE WITH REGULATED OUTPUT

[75] Inventors: Lawrence J. Strojny, Oostburg; Gerald A. Duenkel, Grafton, both of Wis.

[73] Assignee: Johnson Service Company, Milwaukee, Wis.

[21] Appl. No.: 687,154

[22] Filed: Jul. 24, 1996

[51] Int. Cl.$^6$ .................................................. H02P 1/26
[52] U.S. Cl. .......................... 307/87; 318/107; 318/139; 49/28
[58] Field of Search .................. 307/64, 65, 66, 307/68, 85, 86, 87, 110, 109; 318/107, 139; 49/141, 26, 27, 28, 110; 160/DIG. 17, 166.1, 309, 310

[56] References Cited

U.S. PATENT DOCUMENTS

| | | | |
|---|---|---|---|
| 4,220,872 | 9/1980 | Fahey | 307/66 |
| 4,875,539 | 10/1989 | Abvawa et al. | 318/139 |
| 5,012,121 | 4/1991 | Hammond et al. | 307/87 |
| 5,111,058 | 5/1992 | Martin | 307/66 |
| 5,241,217 | 8/1993 | Severinksy | 307/64 |
| 5,241,508 | 8/1993 | Berenguel et al. | 307/66 |
| 5,277,363 | 1/1994 | Hart | 307/66 |
| 5,278,454 | 1/1994 | Strauss et al. | 307/66 |
| 5,519,295 | 5/1996 | Jatnieks | 307/66 |

*Primary Examiner*—Jeffrey Gaffin
*Assistant Examiner*—Peter Ganjian
*Attorney, Agent, or Firm*—Quarles & Brady

[57] ABSTRACT

An electric actuator return-to-normal failsafe system that utilizes a bank of storage capacitors to store electrical energy for returning an electrical actuator to a safe position in the event of a power failure. The failsafe system includes a regulator circuit that regulates the output of the storage capacitor such that a constant power output is applied to the electric actuator. The constant power output from the regulator circuit is also available to provide directional control of the actuator.

20 Claims, 4 Drawing Sheets

ELECTRIC ACTUATOR RETURN-TO-NORMAL USING CAPACITOR ENERGY STORAGE WITH REGULATED OUTPUT

BACKGROUND OF THE INVENTION

1. Field of the Invention

This invention relates generally to a return-to-normal system for returning an actuator or the like to a normal safe position in the event of a power failure and, more particularly, to a return-to-normal system for returning an electric actuator or the like to a normal safe position in the event of a power failure, where the system includes a storage capacitor bank for storing power and a voltage regulator for providing a regulated output of the stored power.

2. Discussion of the Related Art

Various types of control systems, such as heating, ventilation and air conditioning (HVAC) systems of a building, incorporate electric actuators to control the position of many types of dampers, including supply air dampers, return air dampers, exhaust air dampers, fire dampers, etc., the blades of variable volume fans, and valves. Examples of electric actuators for these purposes include the M9100 series electric motor actuator and the M9200 Series electric motor spring return actuator, both available from Johnson Controls, Inc. of Milwaukee, Wis. Both the M9100 Series electric motor actuator and the M9200 Series electric motor spring return actuator operate on 24 VAC or VDC power in association with incremental or proportional controllers.

Dampers in HVAC systems are provided to control the flow of air through the network of air ducts associated with the HVAC system. The damper actuators are responsive to electrical control signals from a controller so as to position the dampers in a desirable position, and thus control the air flow in a desirable manner. Likewise, valve actuators in HVAC systems are used to control the position of valves, such as ball valves, to control the flow of heated or chilled water through a pipe system that provides heating or cooling in the HVAC system. The position of the valves are also controlled by a control signal from the appropriate controller.

It has heretofore been desirable to provide a return-to-normal safety system in association with the different electric actuators so as to return the dampers or valves to a safe position in the event that power in interrupted to the controller and/or actuators. These failsafe systems provide various safety features, such as the reduction of the probability of the spread of fire within the building from open or partially open dampers or to prevent freezing of water pipes due to open outside air dampers in cold climates.

Most known return-to-normal safety systems are mechanical systems that incorporate a mechanical device, such as a spring, where the energy necessary to rotate the actuator to return the damper or valve to a safe position is provided by the energy stored in the spring when it is wound. When normal power is applied to the actuator, this power is used to maintain the spring in a wound configuration.

Because the mechanical failsafe systems are subject to wear and deterioration over time, the reliability of the known failsafe system may be reduced as the system gets older. Therefore, progress in the art has attempted to move away from such mechanical failsafe systems to provide a more reliable and dependable system.

U.S. Pat. No. 5,278,454 issued to Strauss et al. discloses an emergency capacitive energy source and circuit for damper motors and actuator motors. The capacitive energy source and circuit uses a bank of storage capacitors to store electrical energy that is available to provide power to return a damper or actuator to a safe position in the event of a power failure. Although the Strauss et al. system provides a number of advantages over the known mechanical systems, there is still room for improvement in the reliability of these types of failsafe systems. For example, the Strauss et al. system does not provide a mechanism for regulating the power output of the storage capacitor bank to control the amount of power applied to the actuating device.

What is needed is an electric actuator return-to-normal failsafe system that does not suffer the drawback of deterioration of the mechanical systems, and includes a number of improvements over the known electrical failsafe systems. It is therefore an object of the present invention to provide an improved return-to-normal failsafe system.

SUMMARY OF THE INVENTION

In accordance with the teachings of the present invention, an electric actuator return-to-normal failsafe system is disclosed that utilizes a bank of storage capacitors to store electrical energy for returning an electrical actuator to a safe position in the event of a power failure. The failsafe system includes a regulator circuit that regulates the output of the storage capacitors such that a constant power output is applied to the electric actuator. The power output stored in the storage capacitors also can be used to set the direction of the electrical actuator if desirable.

In one particular embodiment, an output voltage signal from a voltage regulator is applied to a gate electrode of a PMOS field effect transistor to maintain the transistor in a non-conductive state when normal power is applied to the failsafe system. When normal power is removed from the gate electrode, the FET becomes conductive allowing power from the storage capacitors to be applied to the electric actuator.

Additional objects, advantages and features of the present invention will become apparent from the following description and appended claims taken in conjunction with the accompanying drawings.

DETAILED DESCRIPTION OF THE PREFERRED EMBODIMENTS

The following discussion of the preferred embodiments directed to an electric actuator return-to-normal failsafe system is merely exemplary in nature and is in no way intended to limit the invention or its applications or uses.

Figure 1:
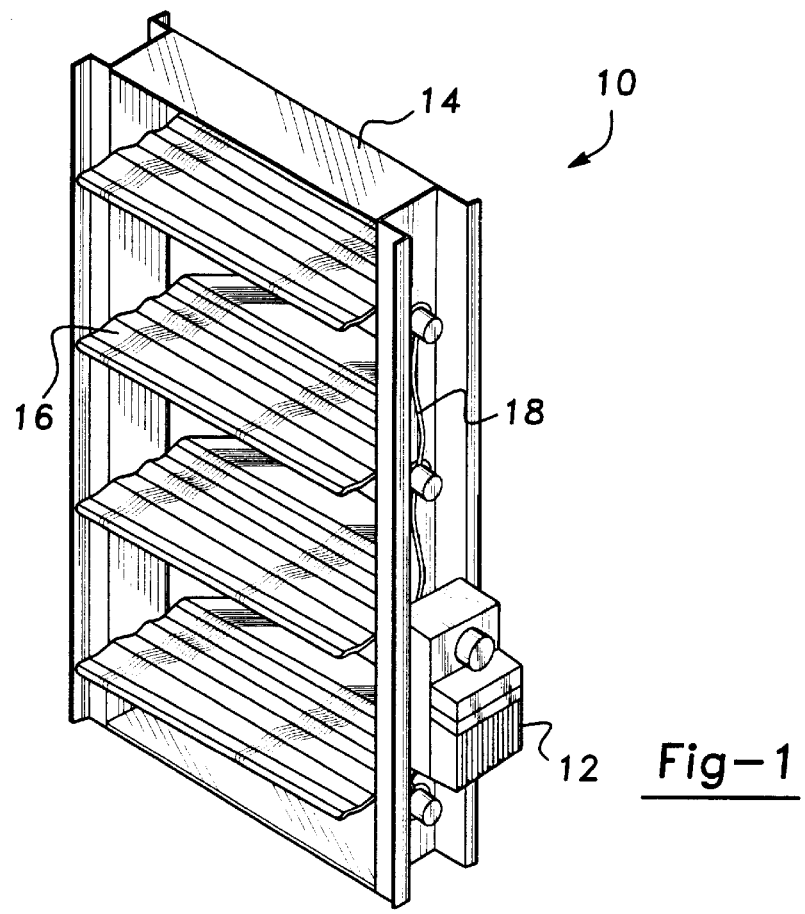
FIG. 1 is a perspective plan view of a damper and control actuator of the type used in association with the present invention.

FIG. 1 shows a perspective plan view of a damper 10 being controlled by an actuator 12. The damper 10 is of the type that can be included in different types of HVAC systems, as would be well understood to those skilled in the art. The damper 10 includes a side frame 14 and a plurality of blades 16. The blades 16 are connected by a linkage 18 such that movement of one of the blades 16 causes all the blades 16 to move. The blades 16 are operable to open and close an airway through the frame 14. The actuator 12 is responsive to a control signal from a controller (not shown). Actuation of the actuator 12 causes one of the blades 16 to rotate on its axis, which in turn causes all of the blades 16 to rotate by the linkage 18. The actuator 12 can be the M9100 Series incremental or proportional electric motor actuator, or any equivalent known to those skilled in the art.

As will be discussed below, the actuator 12 includes a failsafe system that causes the actuator 12 to rotate the blades 16 to a normally open or a normally closed position depending on the design of the system. In most applications, the failsafe system will be designed to rotate the blade 16 to close the airway through the frame 14. Although the description of the failsafe system is in reference to the damper 10, it will be appreciated by those skilled in the art that the failsafe system can have many other applications for many other types of electrical actuators, especially for dampers, fans and valves of an HVAC system.

Figure 2:
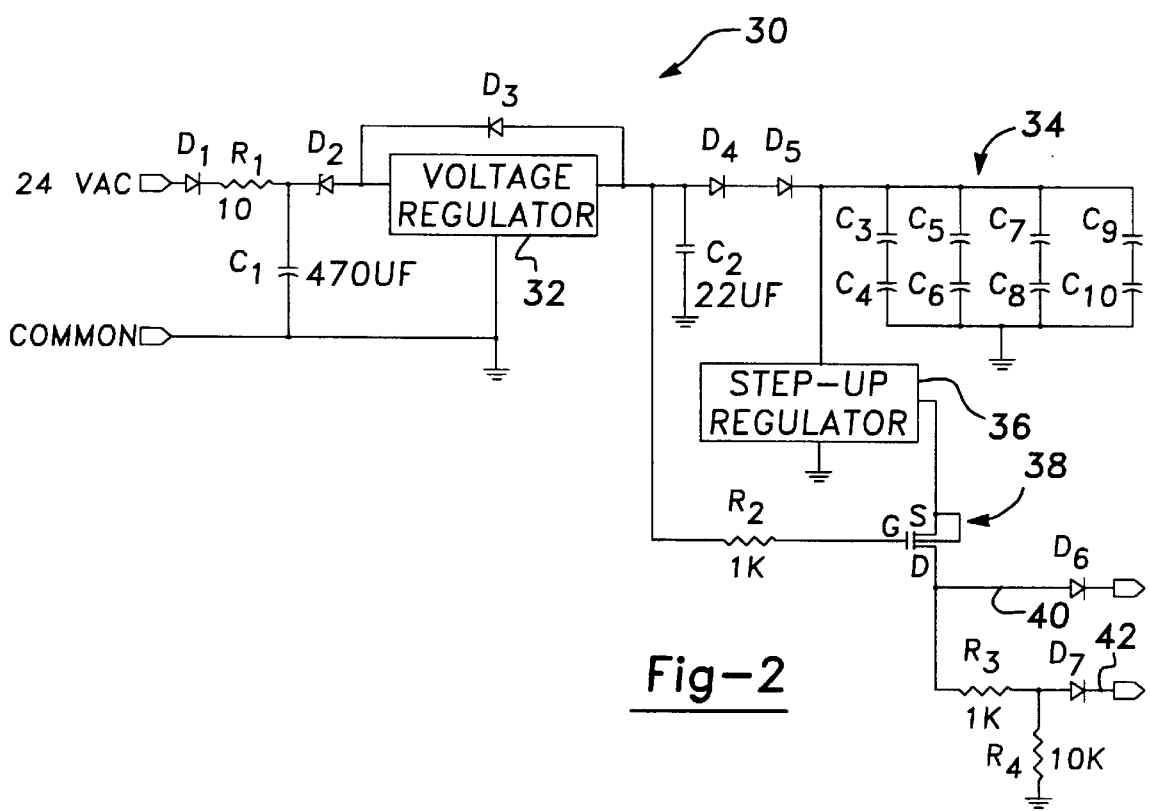
FIG. 2 is a schematic diagram of a return-to-normal failsafe system for an actuator according to an embodiment of the present invention.

FIG. 2 shows a schematic diagram of an electric actuator return-to-normal failsafe circuit 30 according to an embodiment of the present invention. The purpose of the circuit 30 is to provide a source of power and directional control which enables the actuator 12 to be driven to a predetermined position when electric power is lost or removed from the actuator 12 so as to position the blades 16 in a desirable location. Thus, the circuit 30 is intended to be a safety feature.

Typically, electric actuators of the type used for the purposes described herein operate on 24 volts AC or 24 volts DC power. The circuit 30 includes a diode $D_1$ and a capacitor $C_1$ that provides filtering and a half-wave rectified input signal to the circuit 30 from a 24 VAC input power signal. A resistor $R_1$ limits the in-rush current in order to prevent component damage due to excessive current levels, but still allows sufficient current to operate the circuit 30 in the manner as discussed below. A rapid charge time is desirable since typical actuators of the type described herein can reach a final position in about 40 seconds. The rectified input signal is applied to a 12 VDC voltage regulator 32. Voltage regulators of this type are well understood in the art, and can vary from particular system to system. The combination of the resistor $R_1$ and a zener diode $D_2$ help to distribute the heat resulting from regulating the input power applied to the voltage regulator 32. The use of the diode $D_2$ in this application may be eliminated for performance improvement. A feedback diode $D_3$ protects the regulator 32 in the event input power is suddenly lost.

The 12 volt DC output signal from the regulator 32 is applied through a pair of diodes $D_4$ and $D_5$ to a storage bank 34 of capacitors $C_3$–$C_{10}$. Therefore, when the 24 VAC input signal is applied to the circuit 30, the capacitor storage bank 34 will be charged to store power. The diodes $D_4$ and $D_5$ reduce the voltage level of the output signal from the regulator 32 to a voltage level of about 11.5 volts suitable for charging the storage bank 34. The diodes $D_4$ and $D_5$ also prevent the capacitors $C_3$–$C_{10}$ in the storage bank 34 from reverse biasing the regulator 32 in the event of an input power failure.

The positive terminal of the storage bank 34 is connected to a step-up voltage regulator 36. In one embodiment, the step-up regulator 36 is a MAXIM 1771 5 v/12 v/15 v or adjustable, high-efficiency, low $I_Q$, step-up DC-DC controller, known to those skilled in the art. The regulator 36 accepts DC input voltage levels from about 3 to about 12 volts, and maintains a nominal constant output of about 12 VDC.

The 12 VDC output signal from the regulator 32 is also applied to a gate terminal (G) of a PMOS field effect transistor (FET) 38 through a resistor $R_2$. The FET 38 is provided in this application to switch the 12 VDC output of the step-up regulator 36 to the actuator 12 when input power is lost. Applying 12 VDC to the gate terminal of the FET 38 keeps the FET 38 from conducting. When input power is lost, the voltage signal applied to the gate terminal (G) falls off and the FET 38 will conduct. When the FET 38 begins conducting, a voltage signal from the step-up regulator 36 applied to a source terminal (S) of the FET 38 will conduct through the FET 38 to a drain terminal (D). Therefore, stored power from the capacitor storage bank 34 applied through the step-up regulator 36 is available on a return-to-normal actuation line 40. The output power signal from the step-up regulator 36 is also available to provide direction control on a directional control line 42, as will be discussed below. Thus, when power is interrupted, and the output voltage of the voltage regulator 32 goes to zero, power stored in the storage bank 34 is applied through the regulator 36 to the control lines 40 and 42. Diodes $D_6$ and $D_7$ are available to prevent power from being applied to the step-up regulator 36 from the actuator circuit, described below. By keeping the FET 38 off during normal operation, the stand-by power does not interfere with the normal operation of the actuator 12 when normal power is available.

As discussed above, the capacitor storage bank 34 provides the energy necessary to drive an electric actuator during loss of power. The number of capacitors within the storage bank 34 depends on the type of actuator and the temperature environment. The lower the temperature, the lower the energy storage capability. If each of the capacitors $C_3$–$C_{10}$ is one farad, eight farads provides sufficient energy to drive a fully loaded M9108 series actuator to its failsafe position at nominal 15° C. to 50° C. (M9108 is a 8 Newton-meter, 40 sec. actuator) . Additional capacitors would be required for higher torque actuators. Lower temperature operation would require either more capacitance or a heating device to assure the required energy is available. The capacitors are connected in a series/parallel configuration in order to provide both the maximum voltage range to the step-up regulator 38 with minimum resistance loss through the capacitors $C_3$–$C_{10}$ while allowing capacitance to increase in magnitude as required by the application.

Figure 3:
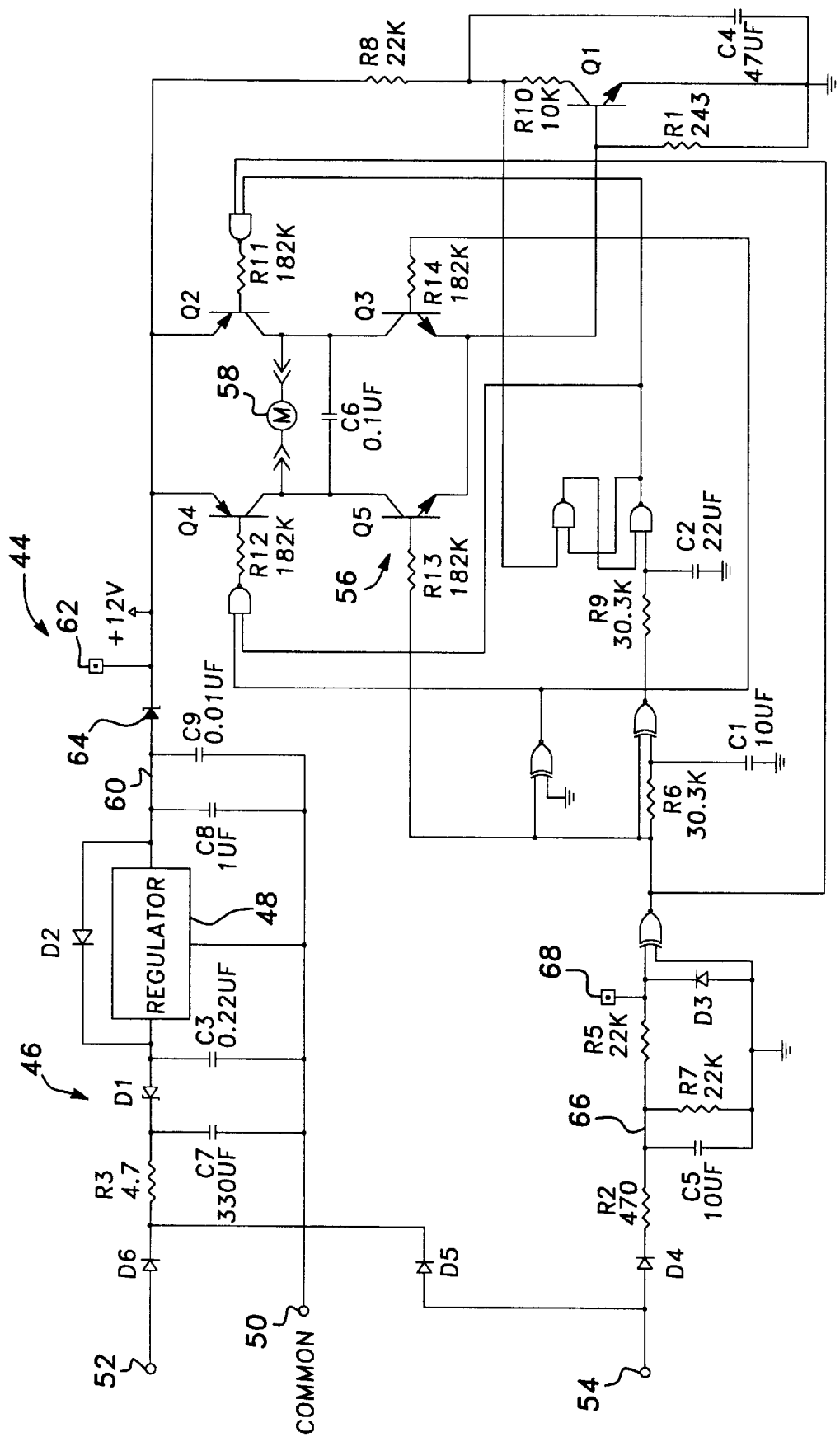
FIG. 3 is a schematic diagram of a proportional actuator to be used in association with the failsafe system of FIG. 2.

FIG. 3 is a schematic diagram of an incremental electric actuator circuit 44, specifically the M9100 incremental electric actuator. The M9100 Series incremental actuators are bi-directional actuators designed to electrically position HVAC equipment, particularly dampers, through 93 degrees of mechanical rotation using 24 volt VAC/VDC. power and control signals, and a 0–20 VDC. or 0–20 MA control signal. The controller driving the incremental actuator does not maintain a specific commanded position signal to the actuator, but commands a timed increase or decrease from the present position of the actuator based on measured parameters. The actuator moves in the direction of the command and stops at any point in its stroke when the command is removed or the actuator stalls.

The actuator circuit 44 includes a power supply circuit 46 including a voltage regulator 48. A 24 VAC/VDC. input power supply signal is applied to a common terminal 50 and a first input terminal 52, or the common terminal 50 and a second input terminal 54. The input signal is half-wave rectified and filtered by the power supply circuit 46 prior to being received by the regulator 48. An output of the regulator 48, which is 12 VDC, nominal, is used to power the electronics and components of the actuator circuit 44. A motor drive circuit 56 uses the input signal to drive a drive motor 58 in either a clockwise or counter-clockwise direction. Thus, a controller can apply the appropriate signal to the terminals 50–54 to open or close the damper 10.

The actuator circuit 44 operates in either a direct acting mode or a reverse acting mode. Incremental control of the drive motor 58 in the direct acting mode is achieved by applying a 24 VAC/VDC. signal to the terminals 50 and 52 to rotate the motor 58 in a clockwise direction until the signal is removed or the motor 58 stalls. Similarly, in the direct acting mode, a 24 VAC/VDC signal applied to the terminals 50 and 54 will rotate the motor 58 in a counter-clockwise direction until the signal is removed or the motor 58 stalls. Conversely, in the reverse acting mode a 24 VAC/VDC. signal applied to the terminals 50 and 52 will cause the motor 58 to rotate in a counter-clockwise direction until the signal is removed or the motor 58 stalls. And, in the reverse acting mode, a 24 VAC/VDC. signal applied to the terminals 50 and 54 will cause the motor 58 to rotate in a clockwise direction until the signal is removed or the motor 58 stalls. The particular mode is determined by jumper pins attached to the motor 58. Rotation of the drive motor 58 operates to adjust the position of the blade 16. The specific operation of the circuit 44 is well known to those skilled in the art, and need not be elaborated on here for the purposes of the present invention. All of the resistor values are in ohms.

The regulated 12 volt DC. output signal from the circuit 30 is connected to an output line 60 from the power supply circuit 46 at a terminal 62. A schottkey diode 64 is included in series with the power supply output line 60 to prevent reverse biasing of the voltage regulator 48 during a power failure. During a power failure, the 12 volt DC. signal from the circuit 30 provides enough power to drive the motor 58 to a failsafe position. By electrically connecting the control line 42 to a terminal 68, the motor 58 will be driven in an opposite direction during a power failure than it would if the control line 42 is not connected to the terminal 68. Thus, the blades 16 can be caused to be opened or closed during a power failure depending on the particular system requirements.

Figure 4A:
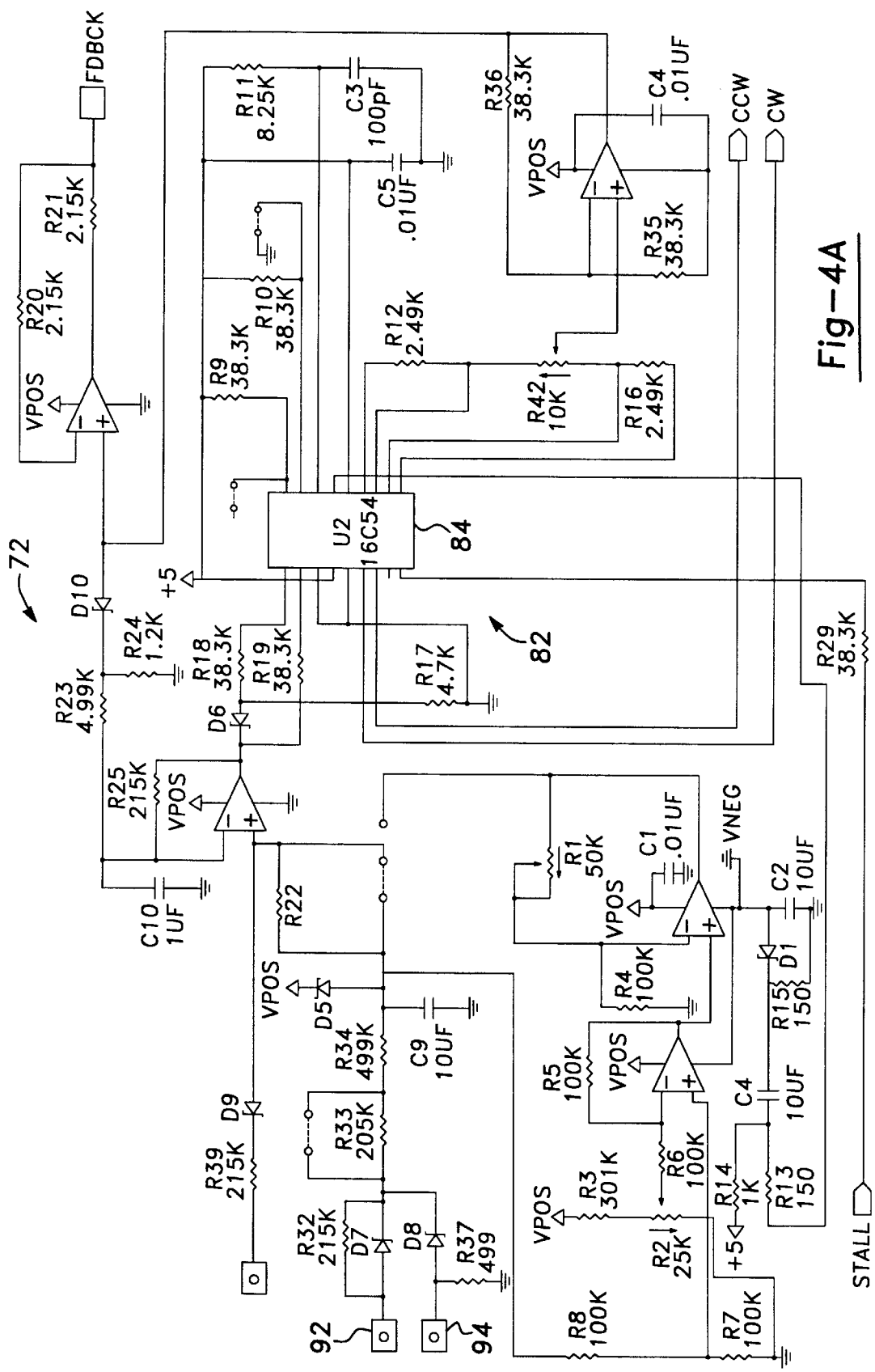
FIGS. 4(A)–4(C) are schematic diagrams of an incremental actuator to be used in association with the failsafe system of FIG. 2.
Figure 4B:
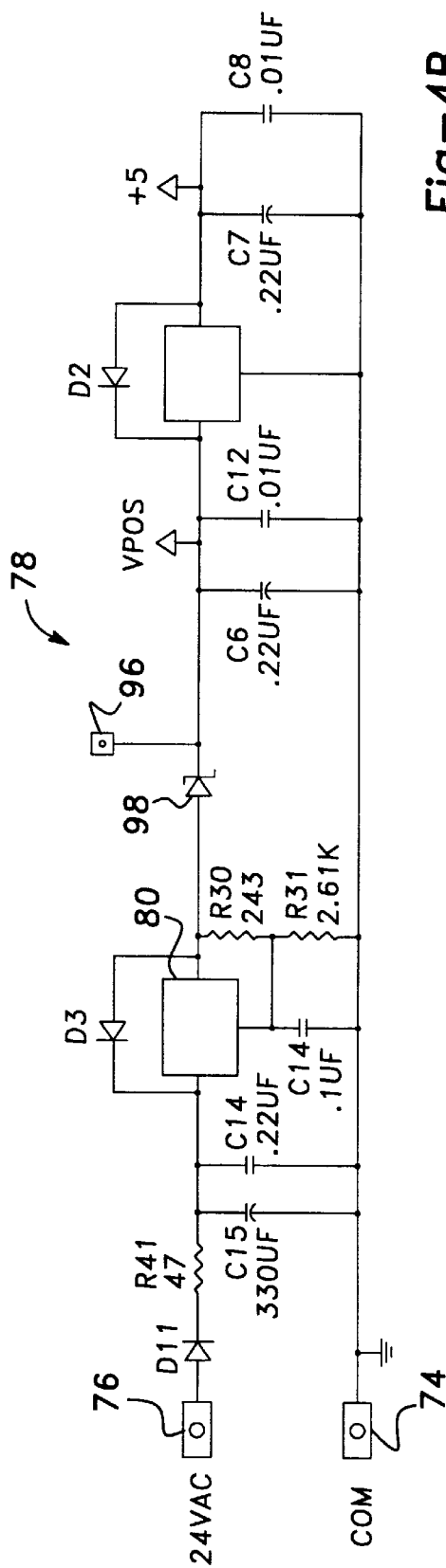
Figure 4C:
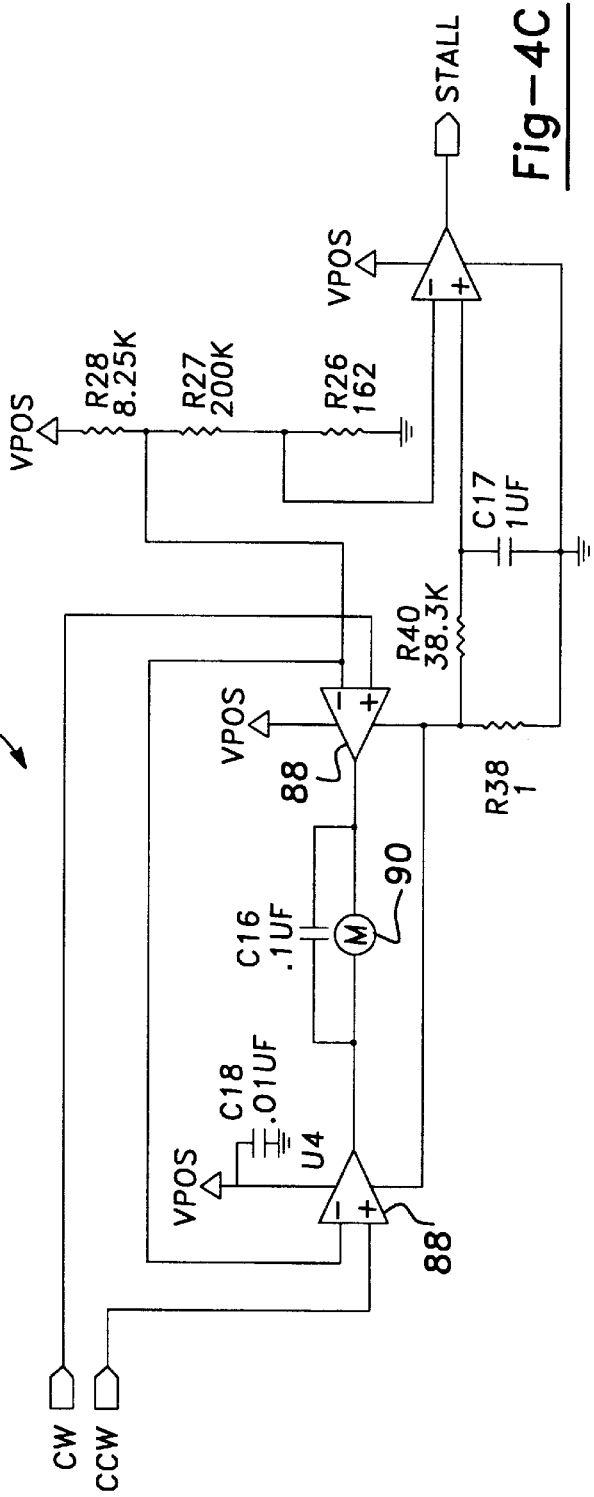

The failsafe circuit 30 can also be used to control a proportional electric actuator. FIGS. 4(A)–4(C) are schematic diagrams of a proportional electric actuator circuit 72, specifically the M9100 proportional electric actuator. The M9100 Series proportional electric actuators are bi-directional actuators designed to electrically position HVAC. equipment, particularly dampers, through 93 degrees of mechanical rotation using a 24 VAC/VDC. power signal, and a 0–20 VDC or 0–20 mA control signal. The proportional electric controller is a type of controller in which the actuator output signal changes in a proportion to the amount of change in a controlled or measured variable.

A 24 VAC/VDC. power input signal from the controller is applied to a common terminal 74 and an input terminal 76 of a power supply circuit 78. The input power signal is half-wave rectified and filtered by the power supply circuit 78 prior to being applied to a voltage regulator 80. The output voltage from the voltage regulator 80 is VPOS and is used to power the components and electronics of the proportional actuator circuit 72.

A processor circuit 82 including a microprocessor 84 controls the operation of the circuit 72. A motor drive circuit 86 includes two motor drive opamps 88 that are configured as comparators to detect increase/decrease commands from the microprocessor 84 to drive a drive motor 90 in opposite directions. An output signal on a CW or a CCW output line from the microprocessor 84 is applied to either of the opamps 88, as shown, to rotate the motor 90 in either the clockwise (CW) or counter-clockwise (CCW) direction. The specific operation and components of the proportional actuator circuit 72 as depicted in these figures is available in the literature, and is known to those skilled in the art.

An input control signal from the controller is applied to input terminals 92 or 94. The actuator 72 also operates in either a direct acting mode or a reverse acting mode. In the direct acting mode, if 0% of the input control signal is applied to either of the terminals 92 or 94, the motor 90 will rotate to the 0% rotation position. As the input control signal is increased to 50% of the input control signal, the motor 90 will rotate in proportion to the input signal, resulting in 50% rotation. If the input control signal is increased to 100% of the input signal, the motor 90 will rotate to the 100% position. In the reverse acting mode, if 100% of the input control signal is applied to either of the terminals 92 or 94, the motor 90 will rotate to the 0% rotation position. As the input control signal is decreased to 50% of the input control signal, the motor 90 will rotate in proportion to the input signal, resulting in 50% actuation rotation. If the input control signal is decreased to 0% of the input signal, the motor 90 will rotate to the 100% position.

When power is interrupted to the power supply circuit 78, then the voltage control signal from the actuator circuit 30 is applied to the power supply circuit 78 at a terminal 96 to provide the power necessary to drive the motor 90 to a failsafe position. A schottkey diode 98 prevents power from the actuator circuit 30 from being applied to the voltage regulator 80. By electrically connecting the control line 42 to the terminal 92, the motor 90 will be driven in an opposite direction during a power failure.

The failsafe system of the invention provides a number of advantages over prior art failsafe systems. For example, the capacitors $C_3$–$C_{10}$ can be charged and discharged indefinitely.

This number of cycles exceeds the mechanical springs and other storage batteries. The typical spring life is 65,000 cycles and a typical battery life is 1,000 cycles. Additionally, the capacitors $C_3$–$C_{10}$ can charge faster than batteries. Also, the circuit 30 provides a regulated output which provides a constant speed actuator operation. A spring returns at a high rate and must be mechanically braked. Also, complex mechanical designs must be constructed to control the transmission of power between the gear assembly and the spring. These can be costly and can lead to mechanical failure. Further, the return-to-normal and non-return actuator uses the same gear assembly and electronics. The return-to-normal function can be packaged separately and added as required. Also, the step-up regulator 36 is over 80% efficient and maximizes the use of the stored energy. The resulting constant speed operation of the actuator 12 further optimizes the energy used. And, because the stand-by power is coupled to the drive circuit through the PMOS FET 38 and diode $D_6$, it is more reliable than the designs using relays to transfer power.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An electronic device comprising:
   a voltage input circuit, said voltage input circuit responsive to an input voltage signal;
   a capacitor storage bank including at least one capacitor, said capacitor storage bank responsive to a voltage signal from the voltage input circuit so as to charge the at least one capacitor and provide a stored voltage signal; and
   a first voltage regulator responsive to the stored voltage signal from the capacitor storage bank, said first voltage regulator providing a stable output voltage signal operable to drive an actuator, wherein the capacitor storage bank applies the stored voltage signal directly to the first voltage regulator so that in the event the voltage signal from the input voltage circuit is removed from the capacitor storage bank, the output signal from the first voltage regulator will move the actuator to a predetermined failsafe position.

2. The electronic device according to claim 1 wherein the voltage input circuit includes a second voltage regulator, said second voltage regulator providing a regulated voltage output signal, said capacitor storage bank responsive to the regulated voltage output signal.

3. The electronic device according to claim 1 wherein the actuator is an electric actuator selected from the group consisting of proportional electric actuators and incremental electric actuators.

4. The electronic device according to claim 1 wherein the stable output voltage signal from the first voltage regulator is connected to the actuator so that the stable output voltage signal provides both actuation of the actuator and directional control of the actuator.

5. The electronic device according to claim 1 wherein the first voltage regulator is a step-up regulator that provides a stable 12 volt output signal.

6. The electronic device according to claim 1 wherein the capacitor storage bank includes eight capacitors.

7. The electronic device according to claim 1 wherein the voltage signal from the input circuit and the stable output voltage signal from the first voltage regulator are applied to a switch, wherein the switch is switched off when the voltage signal from the input circuit is applied to the switch and is switched on when the voltage signal from the input circuit is removed from the switch, and wherein the stable output voltage signal is applied to the actuator through the switch when the switch is switched on.

8. The electronic device according to claim 7 wherein the switch is a PMOS field effect transistor and the voltage signal from the input circuit is applied to a gate terminal of the transistor and the stable output voltage signal is applied to a source terminal of the transistor.

9. The electronic device according to claim 1 wherein the actuator is an electric actuator that controls the position of one of the group consisting of dampers and valves in a heating ventilation and air conditioning system.

10. The electronic device according to claim 1 wherein the at least one capacitor is a plurality of capacitors in the capacitor storage bank that are connected in a series/parallel configuration.

11. A return-to-normal system for returning an actuator to a safe position, said system comprising:
    a voltage regulator, said voltage regulator responsive to an input voltage signal and providing a regulated voltage output signal;
    a capacitor storage bank including a plurality of capacitors, said capacitor storage bank responsive to the regulated output signal from the voltage regulator to charge the plurality of capacitors when the input voltage signal is applied to the voltage regulator so as to provide a stored voltage signal;
    a step-up regulator directly responsive to the stored voltage signal from the capacitor storage bank, said step-up regulator providing a stable output voltage signal operable to drive the actuator; and
    a switch, said switch responsive to the regulated voltage output signal from the voltage regulator, said switch also responsive to the stable output voltage signal from the step-up regulator, wherein the switch is switched off when the regulated voltage output signal is applied to the switch and is switched on when the regulated voltage output signal is removed from the switch, and wherein the stable output voltage signal is applied to the actuator through the switch when the switch is switched on.

12. The system according to claim 11 wherein the actuator is selected from the group consisting of proportional electric actuators and incremental electric actuators.

13. The system according to claim 11 wherein the switch is a PMOS field effect transistor and the regulated voltage output signal is applied to a gate terminal of the transistor and the stable output voltage signal is applied to a source terminal of the transistor.

14. The system according to claim 11 wherein the actuator is an electric actuator that controls the position of one of the group consisting of dampers and valves in a heating ventilation and air conditioning system.

15. The system according to claim 11 wherein the stable output voltage signal from the step-up regulator is connected to the actuator so that the stable output voltage signal provides both actuation of the actuator and directional control of the actuator.

16. A method of returning an actuator to a safe position in the event of a power failure, said method comprising the steps of:
    applying an input voltage signal to a capacitor storage bank including a plurality of capacitors so as to provide a stored voltage signal;
    applying the stored voltage signal directly to a voltage regulator, wherein the voltage regulator provides a stable voltage output signal of the stored voltage signal; and
    causing the voltage regulator to apply the stored voltage signal to the actuator in the event that the input voltage signal is removed from the capacitor storage bank so as to cause the actuator to move to the safe position.

17. The method according to claim 16 wherein the step of causing the regulator to apply the stored voltage signal to the actuator includes applying the storage voltage signal to an electric actuator selected from the group consisting of proportional electric actuators and incremental electric actuators.

18. The method according to claim 16 further comprising the step of applying the input voltage signal to a switch to turn the switch on and off and applying the stable voltage output signal to the switch, wherein when the input voltage signal is removed from the switch the switch is switched on and the stable voltage output signal is applied to the actuator through the switch.

19. The method according to claim 16 wherein the step of causing the voltage regulator to apply the stored voltage signal to the actuator includes the step of using the stored voltage signal to provide both actuation of the actuator and directional control of the actuator.

20. The method according to claim 18 wherein the step of applying the input voltage signal to a switch includes applying the input voltage signal to a gate terminal of a PMOS field effect transistor switch and wherein the stable output voltage is applied to a source terminal of the transistor.

* * * * *